E. CHASE.

Cook Stove.

No. 42,749.

Patented May 17, 1864.

Witnesses
F. H. Brown
O. C. Chase

Inventor
Elisha Chase

UNITED STATES PATENT OFFICE.

ELISHA CHASE, OF CHICAGO, ILLINOIS.

IMPROVEMENT IN PARLOR COOKING-STOVES.

Specification forming part of Letters Patent No. 42,749, dated May 17, 1864.

*To all whom it may concern:*

Be it known that I, ELISHA CHASE, of the city of Chicago, in the county of Cook and State of Illinois, have invented a new Improvement in Stoves; and I do hereby declare that the following is a full, clear, and exact description of the construction and operation of the same, reference being had to the annexed drawings, in which—

Figure 1:
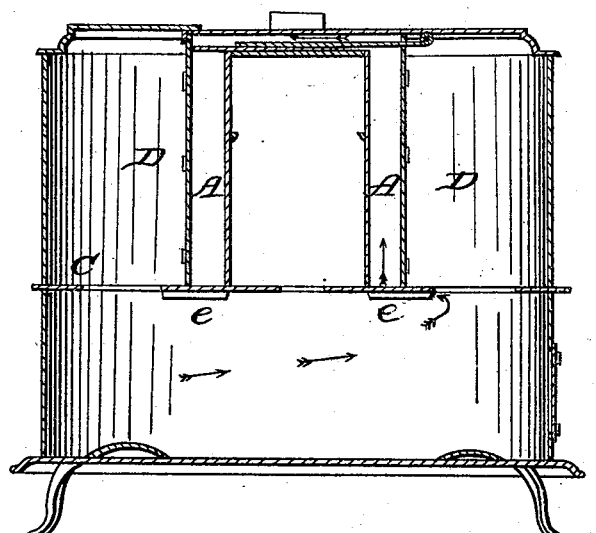
Figure 2:
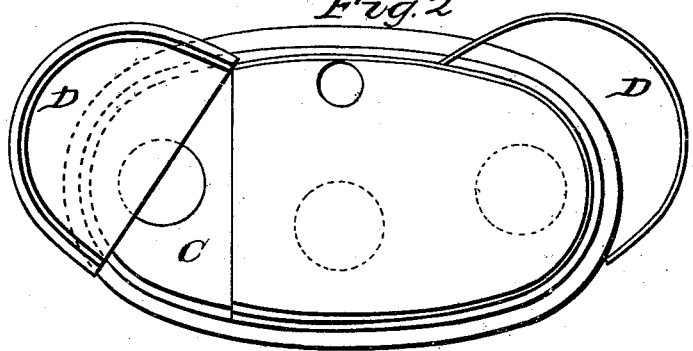
Figure 3:
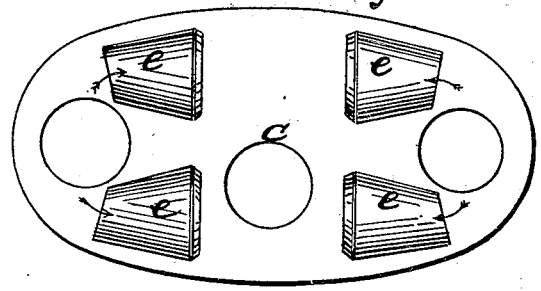

Figure 1 is a vertical view; Figs. 2 and 3, transverse sections.

I construct my stoves of any convenient size of cast-iron or a part of sheet-iron, oval form, (or square,) the usual shape of sitting-room or parlor stoves, below the horizontal plate, (shown at C,) which plate I make with a hole for a lid at each end and flue-holes of sufficient size far enough from each end to leave room for convenient-sized cooking-places. I attach the flues (shown at A A) to the back of the stove and rivet them to plate C. The oven is between the flues A A. The sectional doors or wings I hang on the back of the stove, so they will open and shut over the cooking-places, and thus close them up when desirable. The entrance-flues (shown at $e$ $e$) are put on the under side of the plate C, each side of the lids and attached to it, so as to admit the heat and smoke to go up the flues A A. I make the stoves with or without the entrance-flues, as persons may desire them; also, with or without an oven. When without, the baking is done at the ends by closing the sectional doors. I also make those parts of the top plate directly over the lids to open or not, (as may suit purchasers,) as shown at D, Fig. 2.

What I claim to be my invention, and desire to secure by Letters Patent, is—

The combination, in parlor cooking-stoves, of the following parts, constructed as above shown, namely: the flues A A, their entrances $e$ $e$, the horizontal plate C, and the sectional doors or wings D D.

ELISHA CHASE.

Witnesses:
    CHAS. PHILLIPS,
    JOHN FULLER.